US009584859B2

(12) United States Patent
Weinblatt

(10) Patent No.: US 9,584,859 B2
(45) Date of Patent: Feb. 28, 2017

(54) TESTING EFFECTIVENESS OF TV COMMERCIALS TO ACCOUNT FOR SECOND SCREEN DISTRACTIONS

(71) Applicant: Lee S. Weinblatt, Teaneck, NJ (US)

(72) Inventor: Lee S. Weinblatt, Teaneck, NJ (US)

( * ) Notice: Subject to any disclaimer, the term of this patent is extended or adjusted under 35 U.S.C. 154(b) by 0 days.

(21) Appl. No.: 14/534,009

(22) Filed: Nov. 5, 2014

(65) Prior Publication Data

US 2015/0128159 A1 May 7, 2015

Related U.S. Application Data

(60) Provisional application No. 61/900,129, filed on Nov. 5, 2013.

(51) Int. Cl.
*H04N 21/442* (2011.01)
*H04N 21/81* (2011.01)
*H04N 21/41* (2011.01)

(52) U.S. Cl.
CPC .... *H04N 21/44218* (2013.01); *H04N 21/4122* (2013.01); *H04N 21/4126* (2013.01); *H04N 21/812* (2013.01)

(58) Field of Classification Search
CPC ............ H04N 21/812; H04N 21/44218; H04N 21/4788; G06Q 30/0242
See application file for complete search history.

(56) References Cited

U.S. PATENT DOCUMENTS

| | | | | |
|---|---|---|---|---|
| 2005/0262542 A1* | 11/2005 | DeWeese et al. | | 725/106 |
| 2008/0091512 A1* | 4/2008 | Marci | | G06Q 10/10 705/7.29 |
| 2008/0267442 A1* | 10/2008 | Ferguson | | H04N 17/004 382/100 |
| 2010/0178640 A1* | 7/2010 | Yachin | | A61B 5/168 434/236 |
| 2013/0151333 A1* | 6/2013 | el Kaliouby et al. | | 705/14.45 |
| 2013/0232515 A1* | 9/2013 | Rivera | | H04N 21/44213 725/12 |
| 2014/0114745 A1* | 4/2014 | Bruich | | G06Q 30/0242 705/14.44 |
| 2014/0201767 A1* | 7/2014 | Seiden | | H04N 21/44218 725/12 |
| 2014/0282652 A1* | 9/2014 | Monnerat et al. | | 725/14 |
| 2014/0370479 A1* | 12/2014 | Gazzaley | | A61B 5/162 434/322 |
| 2015/0026708 A1* | 1/2015 | Ahmed | | H04N 5/23206 725/12 |
| 2015/0095145 A1* | 4/2015 | Shulman | | G06Q 30/0241 705/14.53 |

\* cited by examiner

*Primary Examiner* — Hunter B Lonsberry
*Assistant Examiner* — Alexander Q Huerta
(74) *Attorney, Agent, or Firm* — Cozen O'Connor

(57) ABSTRACT

A method for measuring viewer attentiveness to an audio-visual presentation on one display in the presence of a visual distraction on another display simulating a "second screen", comprising: reproducing the audio-visual presentation for viewing by a viewer on a first display; while the audio-visual presentation is being reproduced for viewing by the viewer, providing the visual distraction to the viewer on a second display; and determining whether the viewer switches from viewing the audio-visual presentation to the visual distraction and, if so, continuing to reproduce at least the audio of the audio-visual presentation.

23 Claims, 8 Drawing Sheets

TESTING EFFECTIVENESS OF TV COMMERCIALS TO ACCOUNT FOR SECOND SCREEN DISTRACTIONS

RELATED APPLICATIONS

This application claims priority from U.S. Provisional Patent Application Ser. No. 61/900,129 which was filed on Nov. 5, 2013.

FIELD OF THE INVENTION

The present invention is directed to the field of television advertising and, more particularly, to the field of monitoring test subjects to gauge an effectiveness of television advertisements.

DESCRIPTION OF THE RELATED ART

During known polling and information gathering techniques used to ascertain an effectiveness of television and Internet advertisements, test subjects are typically presented with a viewing screen over which a selection of content may be viewed along with select advertisements/commercials. The test subjects are monitored to see whether they will switch between available programs/advertisements and, if so, when such switching will occur. This monitoring allows the tester to ascertain the possible reason(s) for the switch for the purpose of developing more effective advertisements that will better hold a viewer's attention.

Such testing methodology has become increasingly difficult in recent times because program viewers (i.e., viewers of television programming via traditional television, or through other means such as the internet, satellite, cable, and pre-recorded programming that is played back via digital video recorders ("DVR's"), etc.) are often distracted during program viewing due to the program viewers' use of so-called secondary devices or "second screens", such as tablet computers, smart phones or the like. Program viewers will typically use such second screens while watching programming, especially, during advertisements when a viewer's interest toward the main screen (e.g., the TV screen, etc.) which is used to display the main program will decrease, and then increase again when the program resumes. Unlike a situation where the viewer switches channels during commercials, when a second screen is involved a viewer may still hear the advertisements but the viewer's eyes will be diverted from the main screen to the second screen during the advertisements, and diverted back to the main screen once the programming recommences. If traditional testing methodology is used to measure viewer attentiveness toward TV advertisements, the results will be inaccurate because distractions from second screens are not taken into account.

Accordingly, a testing methodology is needed which will take into account program viewer behavior during television advertisement viewing, particularly when such second screens are distracting viewers from the advertisements, so that data can be obtained on viewer habits to improve effectiveness of advertisements.]

SUMMARY OF THE INVENTION

In accordance with an embodiment, a testing methodology is provided for measuring the quality of viewership of TV commercials by taking into account user distractions from secondary devices, i.e., devices that may occupy a viewer's attention during a commercial break in a viewed program. The program is viewed by a testing subject on a test monitor and simulated commercial interruptions during which advertisements displayed to the viewer are provided on the test monitor. During such simulated commercial interruptions, a distraction is also provided to the viewer for the purpose of diverting the viewer's attention from the advertisement to the distraction. The distraction can be in the form of an interactive prompt on a portion of the test monitor which requires a user to select the prompt, such as by using a computer mouse, or the like, to access a message. The prompt may be accompanied by an audible signal. The distraction can also be in the form of a divided screen, wherein the advertisement is displayed on one part of the screen and the distraction on the other part. The distraction can occur at the commencement of the advertisement but, preferably, occurs at a random time during the advertisement and, most preferably, near the beginning of the advertisement, to better simulate real-world conditions of a viewer. In other words, a viewer may not be immediately distracted by a second screen device when an advertisement commences but, rather, at a short time after the advertisement begins.

The measurement of the viewer's alertness to the advertisement and the distraction can occur in various ways, such as by the user selecting a prompt on the screen or by monitoring the viewer's eyes with a remote camera to gage if the viewer is looking at the screen monitor portion displaying the advertisement, or the screen monitor portion displaying the distraction.

DETAILED DESCRIPTION OF THE DRAWINGS

Figure 1:
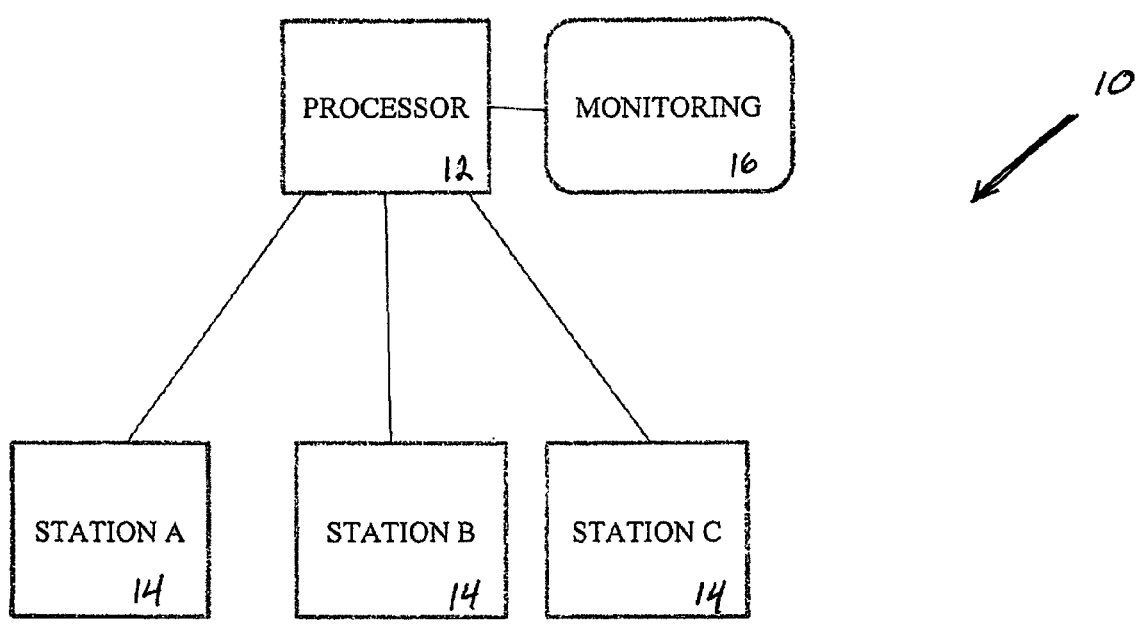
FIG. 1 is a block diagram of a system for presenting a method for monitoring the effects of second screen distractions on program viewers.
Figure 2:
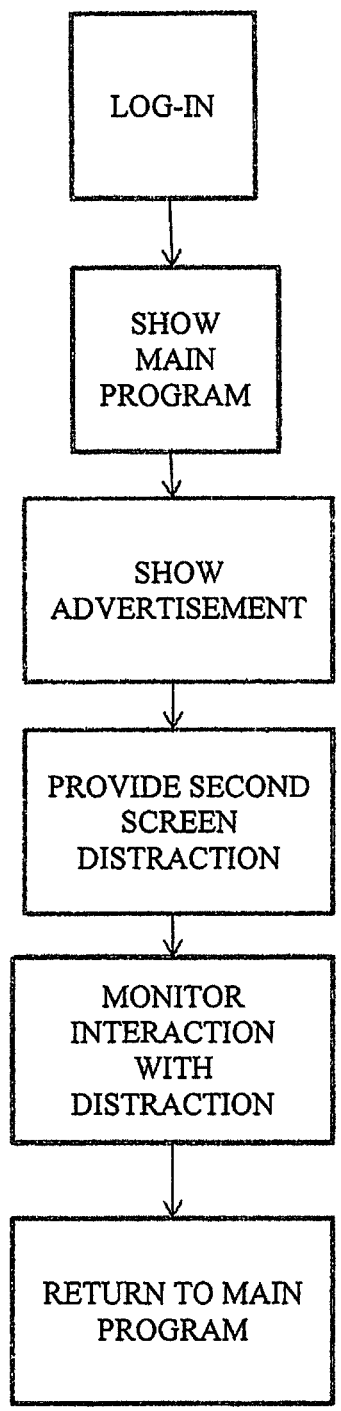
FIG. 2 is a block diagram of the monitoring method.

FIG. 1 illustrates a testing and monitoring system 10 for providing content, including advertisements, to test participants such as viewers. The system includes a processor 12 and one or more testing monitor stations 14A, 14B, 14C, wherein testing subjects are viewing content. The processor 12 comprises computer software instructions, hardware and memory for implementing a method for monitoring the participants. Each testing station includes a monitor and an interface device such as a keyboard, mouse, touch pad, etc., to allow for a testing participant or subject to interact with content displayed on the monitor. Optionally included is a monitoring apparatus 16 such as a video camera which will detect when the eyes of a testing participant are diverted from a main program or advertisement displayed on a station 14 to a distraction message.

In one embodiment, a testing subject will provide log-in information to the system 10 in response to a prompt such as by inputting a user identification. Once log-in is complete and verified, audio visual content such as a television program will be displayed to the testing subject on the monitor by the processor 12. Once the TV program is displayed for a time, the program will cease and an advertisement will be displayed. While the advertisement is displayed, a distraction will be provided to the monitor for viewing by the test subject, and the system will monitor the test subject's interaction with the distraction, such as by use of the monitoring apparatus 16, as an indicator of the effectiveness of the advertisement. For example, minimal or no interaction between the test subject and the distraction will translate into a more effective advertisement from the point of view of capturing and maintaining the attention of the test subject.

In one example, the distraction can be in the form of a visual prompt on a portion of the monitor which will seek the test subject's selection of the prompt. Once selected, a message will be displayed on a portion of the monitor while the advertisement is played, both audibly and visually, on the other portion of the monitor. Alternatively, a portion of a message can be displayed and, by selecting the portion, a complete message will be displayed while the advertisement is played, both audibly and visually. In another example, the monitor screen can be divided, with the advertisement displayed on one portion, and the distraction on the other, and when the distraction is selected, only the audio portion of the advertisement is played. In either case, when the distraction is selected, the audio from the advertisement will continue to be played as would be the case in most situations when a viewer accesses a second screen device during the broadcast of an advertisement. In other words, when a viewer is watching a TV program and a commercial break occurs, the user's eyes maybe diverted to a second screen device while the television station remains selected and the audio signal remains at an audible volume such that the viewer remains exposed to the audio signal while distracted by the second screen device.

It should be pointed out that the message associated with the distraction will not require an urgent interaction on the part of the testing subject (e.g., the distraction will not simulate an emergency call or the like which would normally require immediate attention by the testing subject). Rather, the messages used for the distractions can contain content of any topic which may be of interest to the testing subjects, such as comedy, financial, entertainment, celebrity, and so on. In a testing environment, the same message distraction may be provided to all the tests subjects and the participants can then be interviewed after testing to measure the results of the tests in order to ascertain the effectiveness of particular advertisements in the wake of distractions by second screen devices.

Figure 3:
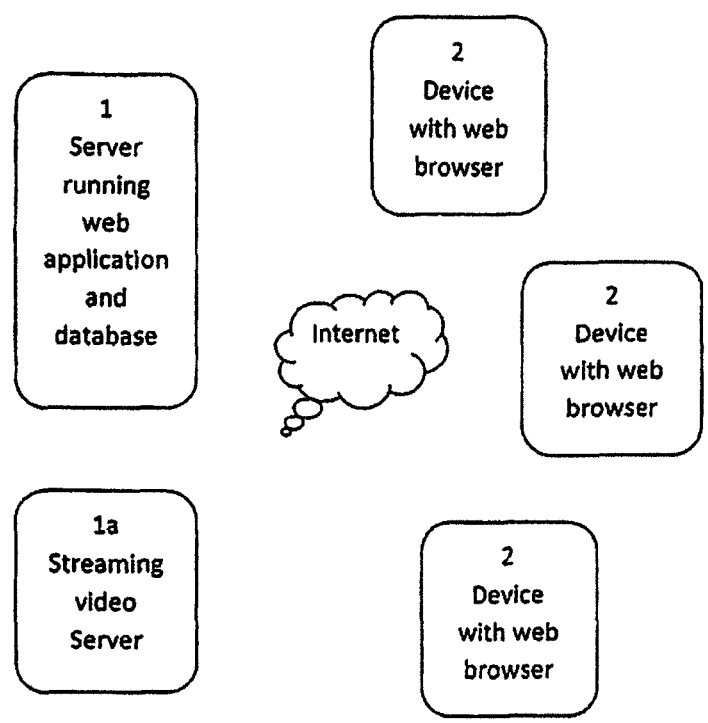
FIG. 3 is a block diagram of an internet-enabled testing embodiment of the present invention.

FIG. 3 depicts a block diagram of a first configuration (Configuration 1), namely a web-centric deployment wherein the Test is performed via a "web applet" running on a web-browser on the Respondent's computer (2). The applet's role is to receive and display streaming content (e.g. shows, commercials, and distractions) on a simulated TV, perform Respondents interactions, and send monitoring data to the Server (1) via the Internet. The Server hosts the web server that delivers the web applet and a computer program to collect real-time data from the Respondent and store it in its local database for post-test report generation. Though not necessary, the streaming content may be provided by a separate video server (1a) for performance considerations.

Figure 4:
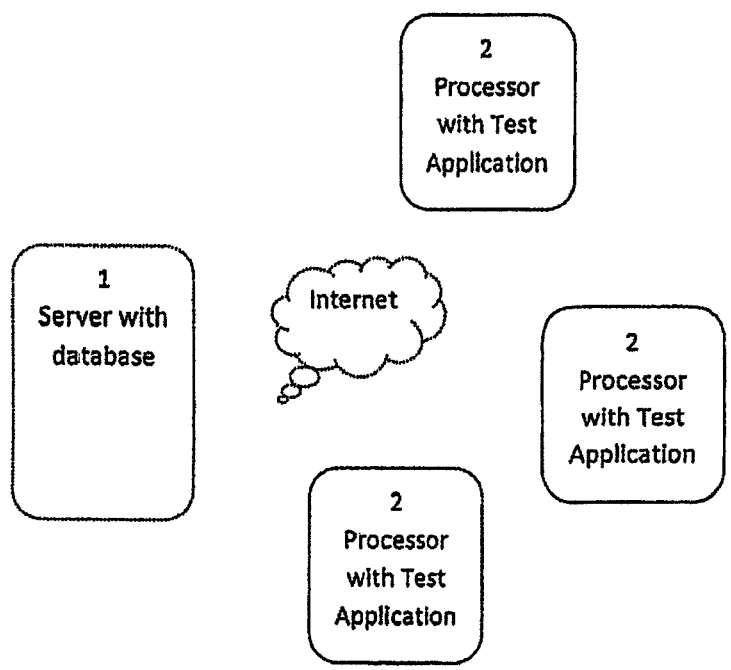
FIG. 4 is a block diagram depicting a system where the internet is not used during the test.

FIG. 4 depicts a block diagram of a second configuration (Configuration 2) wherein the Internet is not used during the Test but may be used to upload Respondent's interactions after completion. In this configuration, an application (commonly referred to as standalone desktop or mobile app) running on the Respondents computing device will contain all the resources (e.g. video, graphics, database) that is normally provided by a server or processor 12.

Client-Server Communication

The Client-Server communication is implemented using the widely deployed and Internet standard REST architecture and JSON Internet media type data encapsulation wherein HTTP requests are initiated from Client to Server and responded by Server to Client. In this case, the Client is the web applet in Configuration 1.

Configuration 2 requires no Client-Server Communication but may use standard FTP to transfer collected data from Respondent's computer to Server for report generation.

Initialization

The test subject, referred to as the Respondent, is assigned a unique alphanumeric identification (ID) that is embedded in the URL link that the user clicks to navigate to the test web site. Upon landing on the initial web page, a "web applet" (in the form of Adobe's Flash file), referred to as the App, is downloaded to the Respondent's web browser running on the Respondent's computing device (PC, Mac, etc.). If the Respondent's browser does not have the required Flash player (or the minimum required version), the browser will automatically prompt the user for permission to download the player. (Should the Respondent refuse to download the Flash player, the test will terminate. It should be noted that while Flash player is purported to be deployed on a majority of browsers today, the same design may be implemented on the emerging and non-proprietary HTML5 Internet standard.)

Operation

When the App starts, it requests the user's ID (for data-logging) and the content playlist. The playlist is a sequential list of URL links of video files the App uses to stream content from the video server. A video streaming connection is then established with the video server and the first video file is played on the Respondent's browser.

Figure 5:
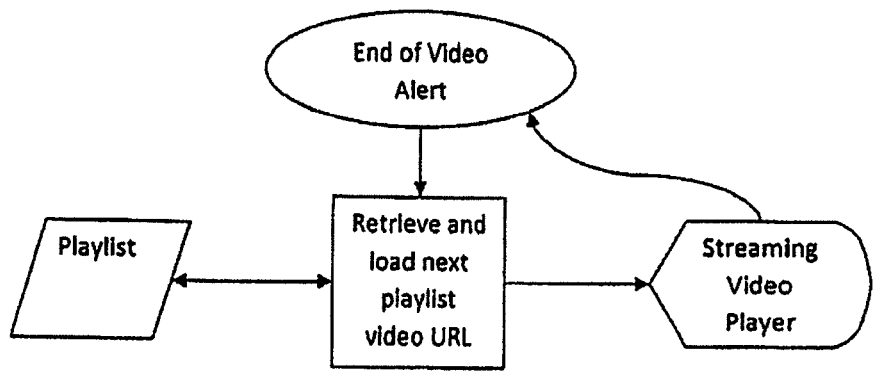
FIG. 5 is a block diagram of a sequential video stream method used in connection with an embodiment of the invention.

(FIG. 5) The Adobe Flash/Flex framework contains a streaming video player element that is used to stream video from a video server to the Respondent's browser. When the end of the video is reached, a notification alert is sent to the App from the video player element, whereupon the next video URL (for the channel) in the playlist is loaded into the video player.

Figure 6:
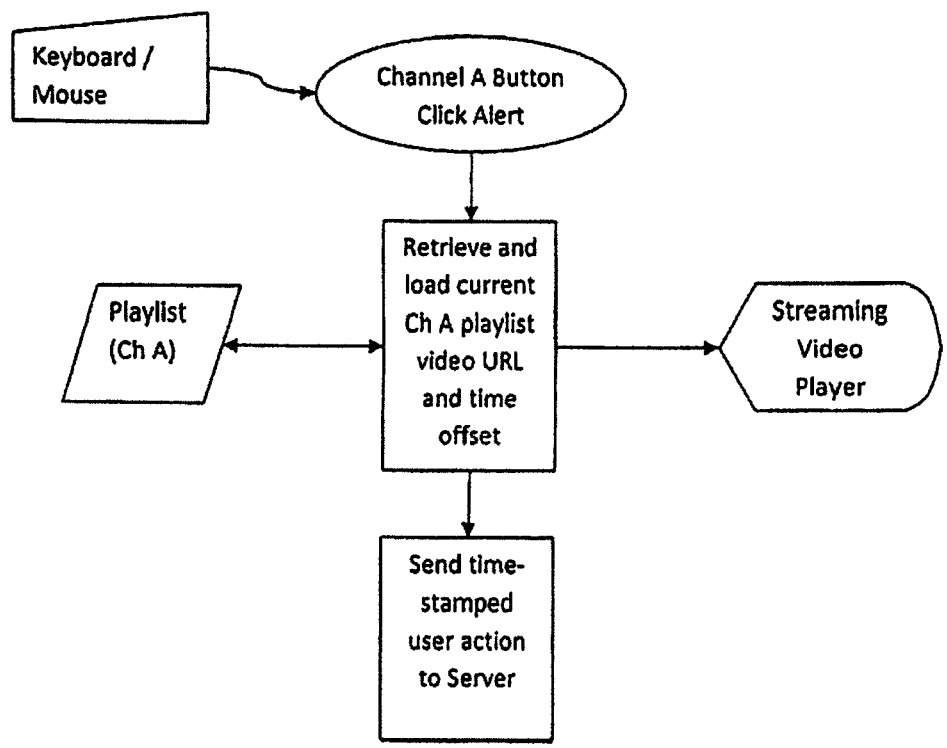
FIG. 6 is a block diagram of a channel changing sequence.

(FIG. 6) To closely simulate a television viewing experience, the App puts the Respondent's browser into full-screen mode and displays the streaming video inside a "TV frame" graphics. The TV frame has a set of television station buttons (e.g. ch 1, ch 2, ch 3) that the Respondent can switch to using the mouse or keyboard "hot-keys" (e.g. numbers 1, 2, 3). The App responds to mouse/keyboard input by making the requisite URL request to the video server with a time offset (e.g. seconds) to simulate switching to a program that is already in progress. This action, along with the Respondent's ID and timestamp, is sent by the App to the Server's data collection program and stored in the database.

Figure 7:
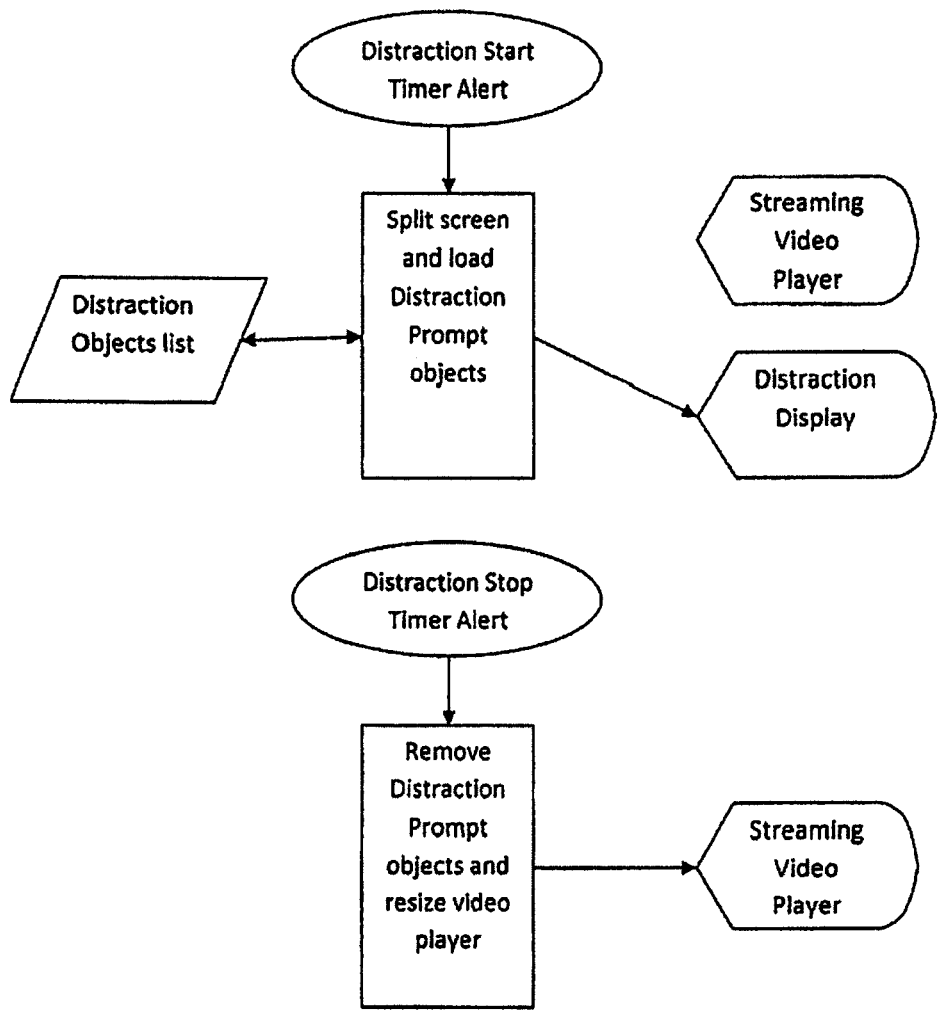
FIGS. 7-9 depict methods of providing distractions to test subjects.
Figure 8:
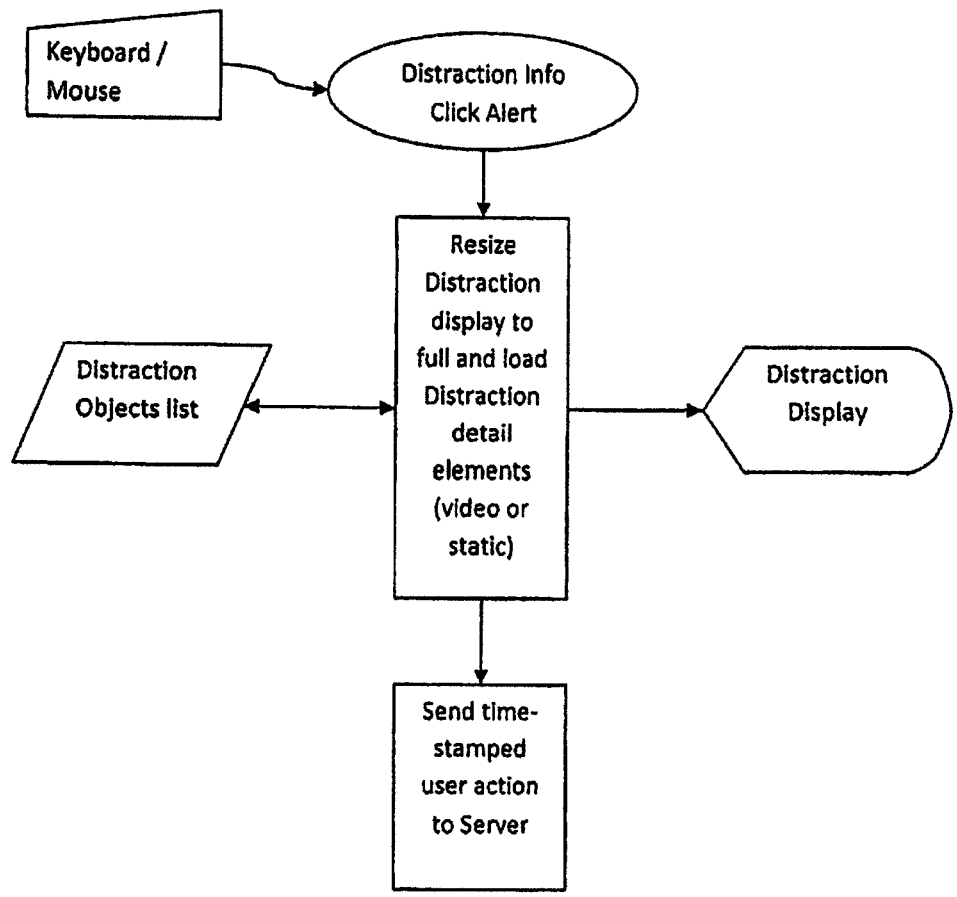
Figure 9:
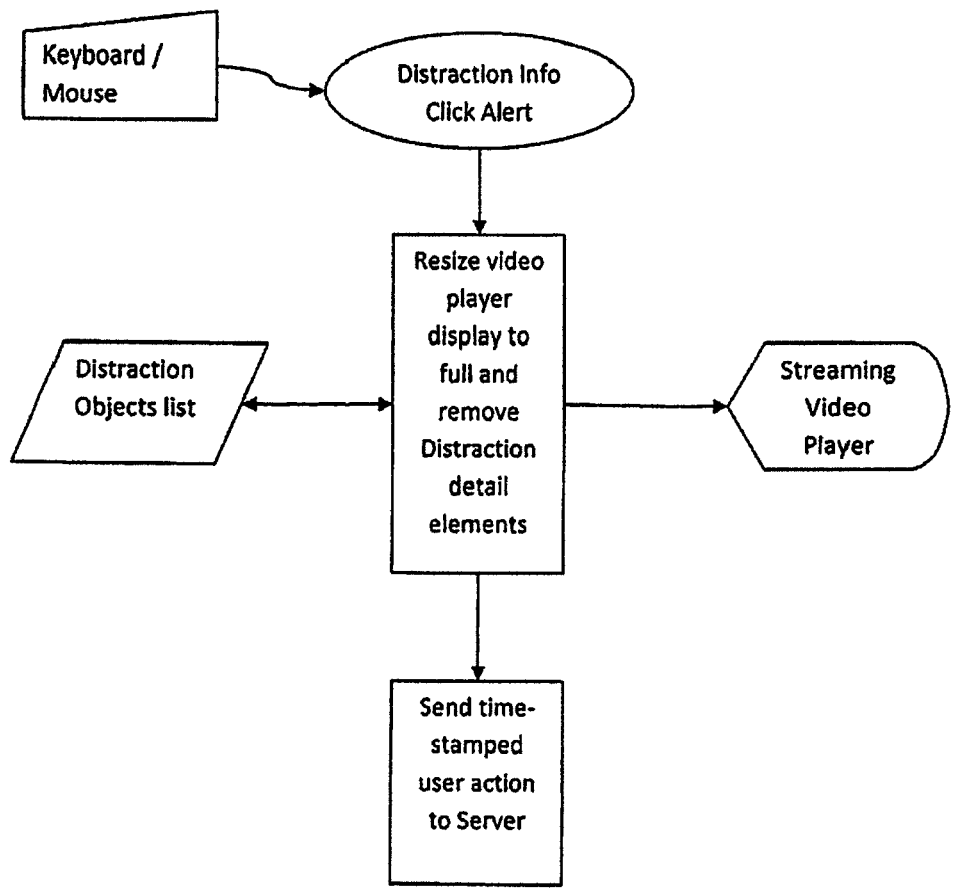

Distractions (FIGS. 7-9)

User distractions may come in many forms. A current implementation is one wherein as a commercial (or even regular programming) is in progress, the simulated TV screen will split into two horizontal displays, one continuing with the regular programming, and the other containing a static page (though a silent video can be substituted) on any content that may provide adequate distraction. Simultaneously, a green "Info" icon will blink at the center-top of the TV screen with a match button next to the channel buttons on the TV frame. The Respondent may then click the Info button to get more details on the Distraction (e.g. breaking news, celebrity gossip, etc.), switching the full view to the associated Distraction content (video or static page). Clicking the Info button or screen will return Respondent to the regular streaming program. If the Respondent does not click on the Distraction Info, the TV screen will return to the single-screen regular programming content. Switching to/from Distraction views are time-stamped and sent to Server database.

The implementation of the Distraction is as follows. Concurrent with the playlist, a sequential list of Distraction objects are retrieved at initialization. A Distraction object contains the time, channel, and corresponding asset of commercial/regular programming during which the Distraction is to be displayed, the type of Distraction, the static Distraction prompt and detail assets (or URL to said assets), and the length of time to display the Distraction. The App will set start-stop timers in accordance with the Distraction objects and upon the firing of these timers it will resize and reposition the display area accordingly along with showing and hiding of the Info button/flashing Icon.

Termination

When the end of the playlist is reached, the App sends an End Of Test message to Server and closes its browser window. In the current implementation, the closing of the browser window will expose the underlying window that contains a series of feedback questions for the Respondent.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. A method for measuring viewer attentiveness to an audio-visual presentation on one display in the presence of a visual distraction on another display simulating a second screen, comprising:
   reproducing, using an application running on a processor, the audio-visual presentation for viewing by a viewer on a first display;
   while the audio-visual presentation is being reproduced by the application for viewing by the viewer, the application provides the visual distraction simulating a second screen to the viewer by displaying the visual distraction on a second display, the visual distraction being retrieved by the application from a set of predetermined distraction objects, each of the distraction objects specifying a corresponding program or commercial during which the visual distraction is to be displayed, a time to display the visual distraction relative to a start of the program or commercial, and a length of time to display the visual distraction; and
   determining whether the viewer switches from viewing the audio-visual presentation to the visual distraction simulating the second screen and, if so, continuing to reproduce at least the audio of the audio-visual presentation,
   wherein the audio-visual presentation comprises at least one commercial, and the visual distraction simulating the second screen is provided by the application at a specified time relative to a start of the at least one commercial.

2. The method of claim 1, wherein the first display and second display are on different portions of the same display screen.

3. The method of claim 1, wherein the viewer switches from viewing the audio-visual presentation to the visual distraction by making a manual selection.

4. The method of claim 3, wherein the step of providing the visual distraction to the viewer is initiated by a visual prompt which, if selected by said manual selection, will show the visual distraction on said second display.

5. The method of claim 4, wherein the visual distraction is provided during the TV commercial.

6. The method of claim 3, wherein the step of providing the visual distraction to the viewer is initiated by a portion of the visual distraction which, if selected by said manual selection, will show the entire visual distraction.

7. The method of claim 3, wherein the step of providing the visual distraction to the viewer is initiated by providing the visual distraction on said second display while the audio-visual presentation is reproduced on said first display and, if said visual distraction is selected by said manual selection, showing the visual distraction on both said first and second displays while continuing to reproduce the audio of the audio-visual presentation.

8. The method of claim 3, wherein the determining step comprises monitoring whether the manual selection of the visual distraction is made.

9. The method of claim 1, wherein the audio-visual presentation includes a television ("TV") program and/or a TV commercial.

10. The method of claim 1, wherein the determining step comprises monitoring the viewer's eye movements.

11. The method of claim 1, further comprising:
   providing the plurality of predetermined visual distractions in a predetermined order, during the audio-visual presentation.

12. Apparatus for measuring viewer attentiveness to an audio-visual presentation on one display in the presence of a visual distraction on another display simulating a second screen, comprising:
   means for reproducing, using an application running on a processor, the audio-visual presentation for viewing by a viewer on a first display;
   means for, while the audio-visual presentation is being reproduced by the application for viewing by the viewer, providing, using the application, the visual distraction simulating a second screen to the viewer by displaying the visual distraction on a second display, the visual distraction being retrieved by the application from a set of predetermined distraction objects, each of the distraction objects specifying a corresponding program or commercial during which the visual distraction is to be displayed, a time to display the visual distraction relative to a start of the program or commercial, and a length of time to display the visual distraction; and
   processing means for determining whether the viewer switches from viewing the audio-visual presentation to the visual distraction simulating the second screen and, if so, continuing to reproduce at least the audio of the audio-visual presentation,
   wherein the audio-visual presentation comprises at least one commercial, and the visual distraction simulating the second screen is provided by the application at a specified time relative to a start of the at least one commercial.

13. The apparatus of claim 12, wherein the first display and second display are on different portions of the same display screen.

14. The apparatus of claim 12, comprising manual selection means for switching from viewing the audio-visual presentation to the visual distraction by making a manual selection.

15. The apparatus of claim 14, wherein the means for providing the visual distraction to the viewer initially provides a visual prompt which, if selected by said manual selection, will show the visual distraction on said second display.

16. The apparatus of claim 15, wherein the visual distraction is provided during the TV commercial.

17. The apparatus of claim 14, wherein the means for providing the visual distraction to the viewer initially provides a portion of the visual distraction which, if selected by said manual selection, will show the entire visual distraction.

18. The apparatus of claim 14, wherein the means for providing the visual distraction to the viewer initially provides providing the visual distraction on said second display while the audio-visual presentation is reproduced on said first display and, if said visual distraction is selected by said manual selection, showing the visual distraction on both said first and second displays while continuing to reproduce the audio of the audio-visual presentation.

19. The apparatus of claim 14, wherein the determining means comprises monitoring whether the manual selection of the visual distraction is made.

20. The apparatus of claim 12, wherein the audio-visual presentation includes a television ("TV") program and/or a TV commercial.

21. The apparatus of claim 12, wherein the determining means comprises monitoring the viewer's eye movements.

22. Apparatus for measuring viewer attentiveness to an audio-visual presentation on one display in the presence of a visual distraction on another display simulating a second screen, comprising:
 a first display and a second display;
 a processor configured to:
 cause reproduction, using an application running on the processor, of an audio-visual presentation for viewing by a viewer on the first display;
 while the audio-visual presentation is being reproduced for viewing by the viewer, cause display of a visual distraction simulating a second screen on the second display, the visual distraction being retrieved by the application from a set of predetermined distraction objects, each of the distraction objects specifying a corresponding program or commercial during which the visual distraction is to be displayed, a time to display the visual distraction relative to a start of the program or commercial, and a length of time to display the visual distraction; and
 after display of the visual distraction, determine whether the viewer switches from viewing the audio-visual presentation to the visual distraction simulating the second screen and, if so, continue to reproduce at least the audio of the audio-visual presentation,
 wherein the audio-visual presentation comprises at least one commercial, and the processor is configured by the application to cause display of the visual distraction simulating the second screen at a specified time relative to a start of the at least one commercial.

23. The apparatus of claim 22, wherein the processor is configured to:
 cause display of a plurality of predetermined visual distractions on the second display, in accordance with a predetermined schedule.

* * * * *